United States Patent [19]

Hammett

[11] Patent Number: 4,628,499

[45] Date of Patent: Dec. 9, 1986

[54] LINEAR SERVOACTUATOR WITH INTEGRATED TRANSFORMER POSITION SENSOR

[75] Inventor: Geoffrey G. Hammett, Duluth, Ga.

[73] Assignee: Scientific-Atlanta, Inc., Atlanta, Ga.

[21] Appl. No.: 616,292

[22] Filed: Jun. 1, 1984

[51] Int. Cl.$^4$ .................. G05B 11/28; F15B 13/16
[52] U.S. Cl. .................... 364/167; 91/361; 91/459; 318/599; 318/657; 364/183; 364/510
[58] Field of Search .............. 364/167, 174, 183, 509, 364/510; 318/590, 597–600, 638, 645, 647, 652–661; 91/358 R, 361, 363, 364, 459; 340/870.35, 870.36

[56] References Cited

U.S. PATENT DOCUMENTS

| | | | |
|---|---|---|---|
| 3,548,170 | 11/1964 | Bruce et al. | 364/130 |
| 3,874,407 | 4/1975 | Griswold | 91/459 X |
| 4,006,391 | 2/1977 | Deering et al. | 318/599 X |
| 4,132,152 | 2/1979 | Hunkar et al. | 91/364 |
| 4,133,250 | 1/1979 | Heintz | 91/364 X |
| 4,138,632 | 2/1979 | Pauwels et al. | 318/599 |
| 4,227,044 | 10/1980 | Fencl | 178/18 X |
| 4,263,538 | 4/1981 | Richiardi | 318/568 |
| 4,276,502 | 6/1981 | Elliot | 318/599 X |
| 4,323,884 | 4/1982 | Durandeau et al. | 318/657 |
| 4,379,335 | 4/1983 | Kirsch et al. | 364/513 |
| 4,432,063 | 2/1984 | Resnick | 364/513 |
| 4,442,390 | 4/1984 | Davis | 318/660 |
| 4,467,320 | 8/1984 | McPhee | 318/657 X |
| 4,481,451 | 11/1984 | Kautz et al. | 318/663 X |
| 4,481,768 | 11/1984 | Goshorn et al. | 91/361 X |
| 4,484,443 | 11/1984 | Takigawa et al. | 91/361 X |
| 4,490,913 | 1/1985 | Vis | 33/DIG. 2 X |
| 4,551,699 | 11/1985 | De Jong et al. | 336/135 |

OTHER PUBLICATIONS

Burleigh et al., "Hydraulic Fluid Power Components for Microprocessor Control" *Design News*, 2/20/84.
"Theory and Application of Linear Variable Differential Transformers", Columbia Research Laboratories, Inc., date and author unknown.
"Servo System Air Cylinder", date and author unknown.
Mortimer, Carol D., "Schaevitz Engineering's Large Bore/Small Core LVDTs", *Sensors*, Feb., 1984.

*Primary Examiner*—Joseph Ruggiero
*Attorney, Agent, or Firm*—Jones & Askew

[57] ABSTRACT

A linear servoactuator including an integrated split-secondary differential transformer position sensor and a fluid driven linear actuator controlled by solenoid poppet valves. Signals from the position sensor transformer are digitized and linearized by a control microcomputer by using digitized transformer signals as addresses for a programmable read only memory. The linearized output is compared to a command position to determine an error value. When the error reaches a predetermined magnitude, indicating that the actuator is approaching the command position, solenoid poppet valves are actuated by a pulse-width modulated signal from the microcomputer to progressively decrease the fluid flow to the actuator for deceleration.

25 Claims, 7 Drawing Figures

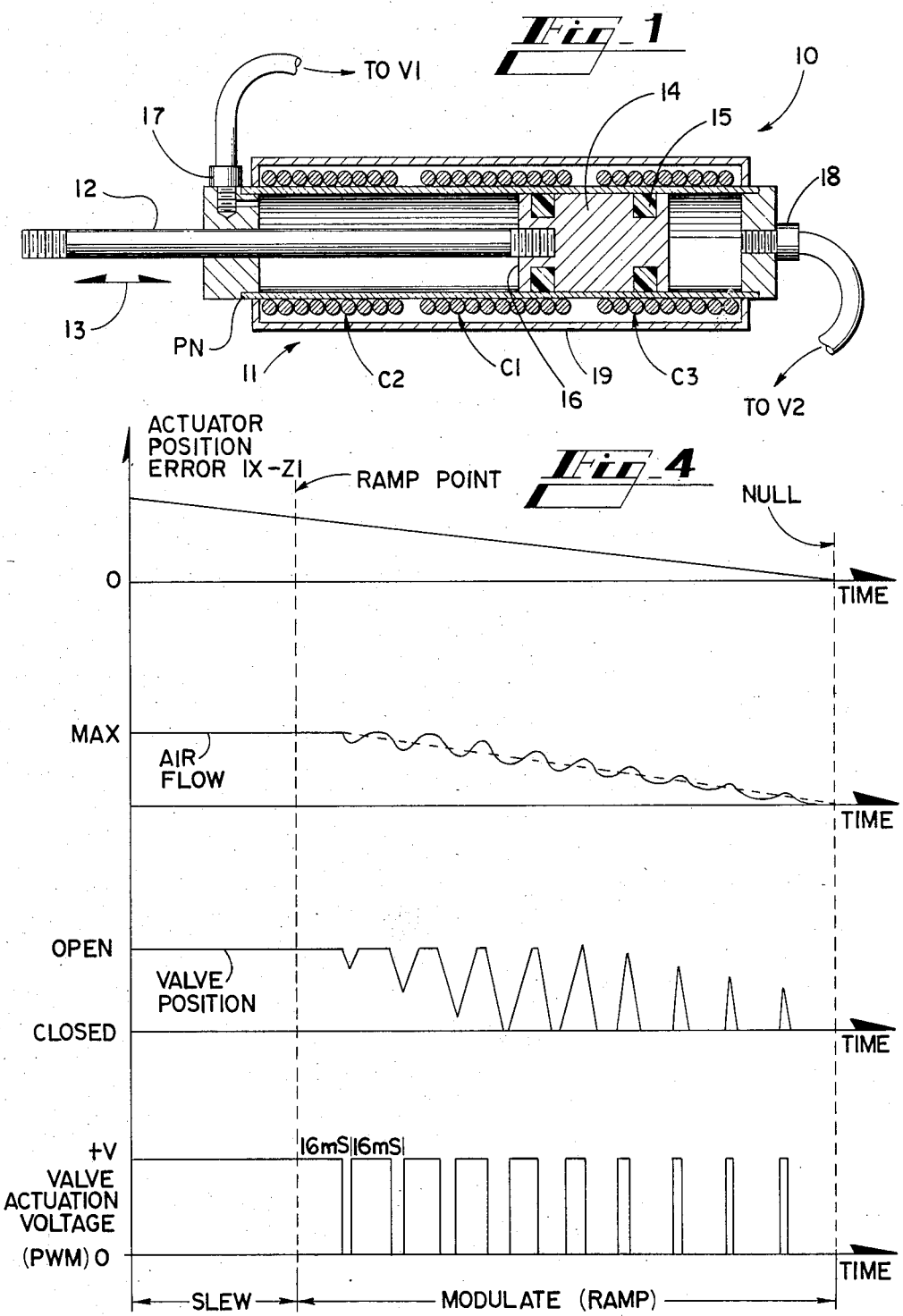

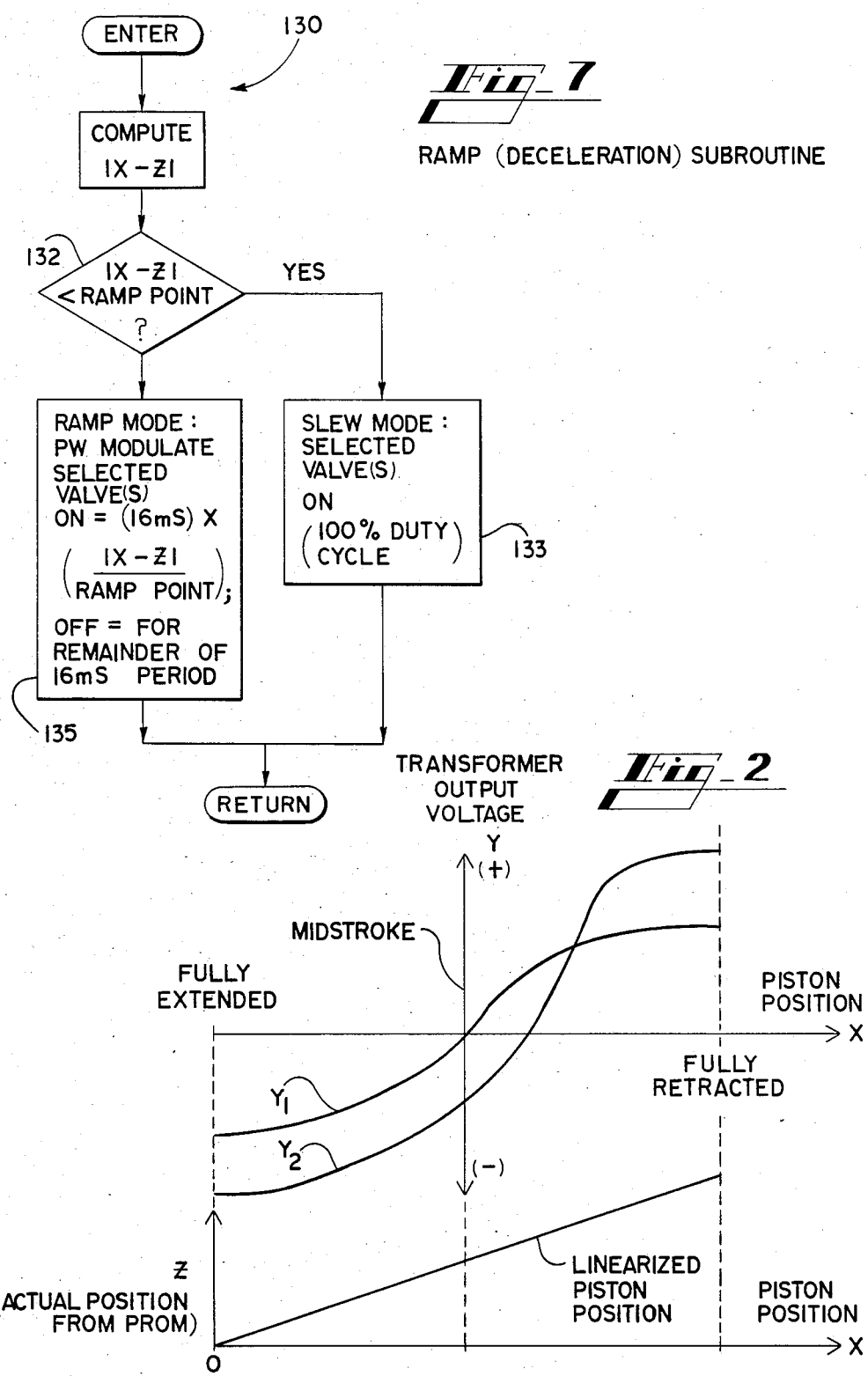

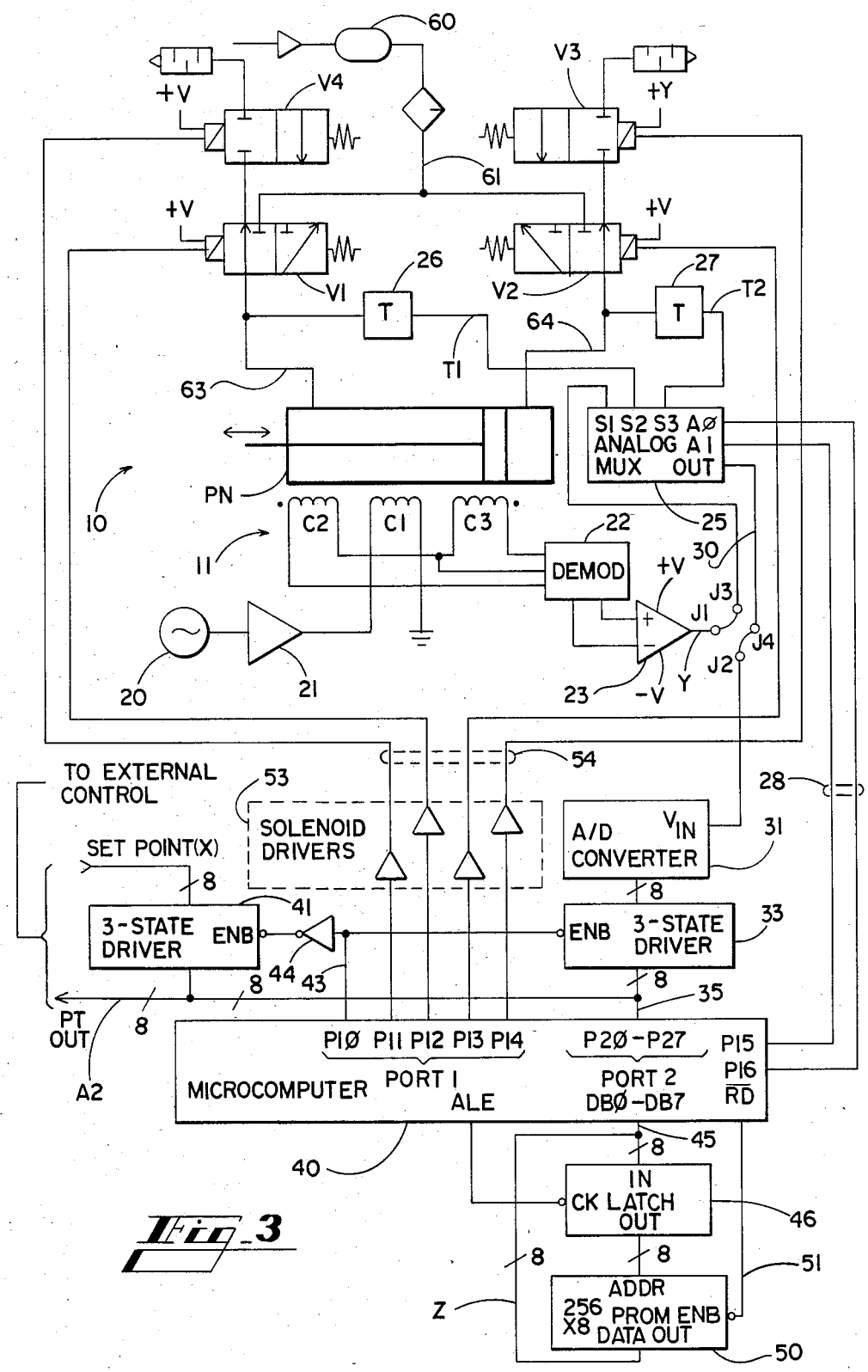
Fig_3

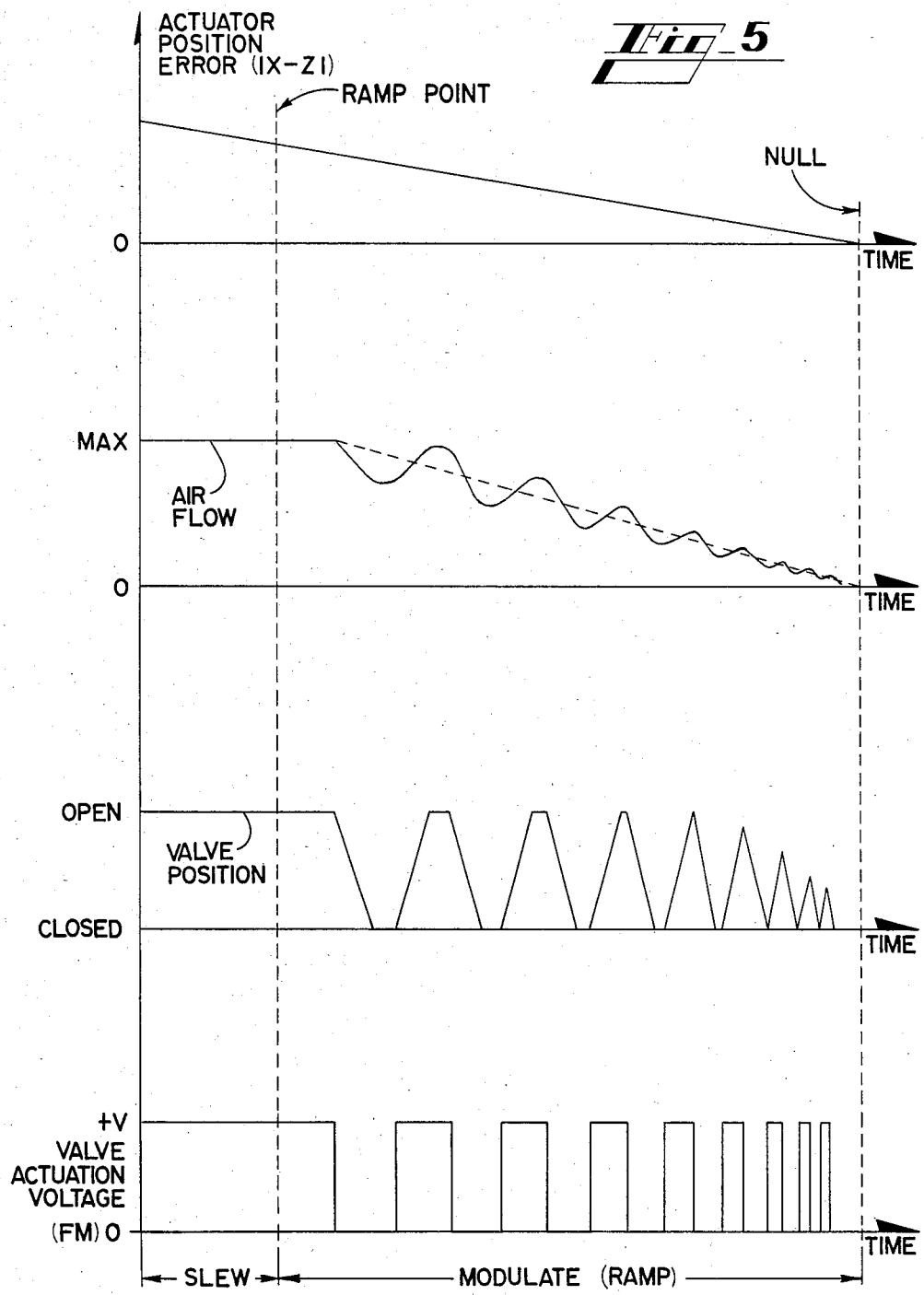

LINEAR SERVOACTUATOR WITH INTEGRATED TRANSFORMER POSITION SENSOR

TECHNICAL FIELD

The present invention relates generally to servomechanisms, and more particularly relates to a fluid-driven linear actuator servomechanism including a differential transformer position sensor whose output is linearized by a programmed microcomputer. Smooth mid-stroke positioning and deceleration of the actuator is effectuated by pulse-width modulating solenoid valves to ramp the actuator into a desired or command position.

BACKGROUND ART

Linear and other types of servomechanisms have long been known for use in machine control arts. Many existing methods of servo control, however, involve expensive, large, and intricate apparatus, and are not generally considered useful in electronic probing or dexterous module handling frequently encountered in modern manufacturing environments. Modern manufacturing facilities frequently employ robot manipulators having end-of-arm tools such as grippers or fingers for manipulating small parts, and these applications require small and accurate actuators and sensors.

Electric servo systems typically employ rotary actuators (motors) which require a complex and error-prone transmission system to convert the rotary motion into a linear motion frequently desirable for assembly and test fixtures. Additionally, the requisite position and velocity sensors and motor power supplies often make electric servo systems prohibitively expensive and bulky for many applications.

Direct-current stepping motors are also sometimes used in servomechanisms, but these devices suffer from low power and also require some form of mechanical transmission to create a linear motion. Stepping motors are open loop devices which are susceptible to error unless used in conjunction with a rotary position sensor for feedback.

One device known for positioning control of a linear actuator includes a pneumatic cylinder coupled by a ball screw to a rotary encoder, which detects the position of the actuator rod and provides a position signal to a control unit. The control unit typically counts transmitted pulse signals from the encoder, and when the actuator rod reaches a preset position, the valve driving the cylinder is closed and the control unit actuates a magnetic brake to halt the movement of the actuator rod. This device is expensive and complex due to the high cost of incorporating a rotary encoder, a ball screw driving mechanism for the encoder, and a magnetic brake.

Another approach to employing fluid linear actuators in servomechanisms involves use of a magnetic piston in the cylinder to actuate magnetic reed switches or a Hall effect sensor. Typically, however, this approach is used to provide an end-of-stroke signal to a programmable controller to indicate that the cylinder is not jammed. The position of the reed or Hall-effect sensor can be manually adjusted along the stroke of the cylinder so that a signal may be generated at various actuator positions. The signal can also be used to open and close solenoid valves for crude mid-stroke positioning of the actuator. However, the positional inconsistency of the reed switch actuation, the lack of controlled deceleration, and the inherent compliance or "springiness" of the air cylinder make the system highly inaccurate. Other drawbacks to the magnetic switch method include the requirement for manual movement of the switches to change the stopping position of the actuator, and the limitation on the number of switches that can be employed on one cyliner due to the relatively large package size of the switch body.

Linear variable differential transformers (LVDT) are also known for measuring linear displacement, but these devices typically involve precision winding on the secondary coils so as to provide a transformer secondary output which varies linearly with the movement of a magnetic plunger which moves axially within the primary and secondary coils. These devices are expensive and do not lend themselves readily to incorporation with fluid linear actuators due to the difficulties in mid-stroke position control of such types of actuators.

Hydraulic servo systems often use precision machined servo valves which must be individually flow tested. The high degree of precision required in manufacturing together with the relatively low volumes of production by current vendors lends to high costs for hydraulic servo mechanisms.

One known approach for actuator control in closed-loop fluid servo systems is the electrohydraulic, variable-displacement axial-piston pump. This pump provides an output flow in proportion to the level of a DC analog command signal from a programmable controller. This command signal is applied to a pulse-width-modulating control unit which compares a command signal (commanded pump displacement) to an analog feedback signal (measured actual pump displacement) from a potentiometer coupled to the pump yoke. The error signal is amplified and converted to a pulse-width-modulated output that controls pump yoke movement through a proportional valve. The amplitude (voltage) of these pulses is fixed, but the width (duration) is proportional to the difference between commanded and actual displacement. The error signal is applied through a power stage to one of two solenoids of a three-way proportional valve, which controls both the direction and rate of flow routed to the pump's yoke mechanism. While this device has been proven successful to minimize overshoot, the proportional valves employed are precision-machined and are consequently very expensive. Such an approach is also generally large and cumbersome and unsuited for use with small-scale systems.

Accordingly, there is a need for a low cost linear servoactuator system which does not involve the use of rotary encoders, expensive precision-wound LVDT's, precision servo or proportional valves, or other expensive or complex components. The advent of the low-cost microcomputer has made possible the incorporation of low-cost devices and components whose performance may be optimized by monitoring and controlling operation thousands of times per second. There are now available low-cost solenoid fluid valves which have extremely rapid response times which can be employed for control of fluid actuators. Additionally, there are now available low-cost analog-to-digital converters which can be employed to convert analog signals from sensors for use by microcomputers. Accordingly, a successful approach to solving the problem of providing low-cost linear servoactuator control will represent the merger of analog electronics, digital electronics, and fluid mechanics.

SUMMARY OF THE INVENTION

Briefly described, the present invention is a servomechanism constructed around a fluid actuator cylinder which includes an axially positionable actuator rod having a magnetically permeable portion. A variable split-secondary differential transformer is used for position sensing. The transformer includes a primary coil wound about the mid-section of the cylinder and positioned between a pair of spaced-apart secondary coils, wound about the ends of the cylinder. The primary coil is excited by an oscillator to produce a time-varying electromagnetic field, which is coupled onto the secondary coils by the magnetically permeable portion of the actuator rod. Circuitry connected to the secondary coils provides a signal which varies as a function of the position of the actuator rod.

Advantageously, the secondary coil need not be precision wound so as to produce a linear output voltage, since the disclosed embodiment includes means for transforming the coil signal into an actual position signal which varies linearly as a function of the position of the actuator. In the disclosed embodiment, a programmed microcomputer receives the coil signal voltage after it has been digitized and uses the digital value as an address for a look-up table stored in programmable read only memory (PROM). The output of the PROM is a digital number which varies linearly with the actual position of the actuator rod.

The present invention further includes means for providing the system with a signal representative of a desired or command position or other control parameter for the actuator. This signal may be provided from a host controller, manual thumb wheel switches, or other external source.

The programmed microcomputer computes an error signal as a function of the difference between the desired position and the actual position of the actuator rod, as indicated by the position sensor. The computer then provides a driving signal which actuates a solenoid valve to introduce pressurized fluid into the actuator to move the actuator rod. In the disclosed embodiment, the actuator driving signal is pulse width modulated to cause the valve to actuate on a progressively decreasing duty cycle as the actuator rod approaches within a predetermined distance of the desired position, so as to decelerate the rod and minimize overshoot.

Accordingly, it is an object of the present invention to provide a low cost linear servoactuator.

It is another object of the present invention to provide a compact and low cost servoactuator suitable for use as a gripper or finger actuator for a robot end-of-arm tool.

It is another object of the present invention to provide a linear servomechanism which employs an inexpensive nonprecision position sensor for sensing the position of the actuator.

It is another object of the present invention to provide an inexpensive and efficient system for linearizing the output of a differential split-secondary transformer used as a linear position sensor.

It is another object of the present invention to provide a system for controlling a fluid actuator wherein the actuator may be slewed at high speed until the actuator attains a predetermined distance from a desired position, and then decelerated as the actuator approaches the desired position.

It is another object of the present invention to provide a system for sensing pressure exerted by a linear actuator against a workpiece for providing force or tactile feedback to the control system for the actuator.

It is another object of the present invention to provide a position sensor involving a differential transformer without requiring precision windings of the coils of the transformer to obtain a linear output.

These and other objects, features, and advantages of the present invention may be more clearly understood and appreciated from a review of the following detailed description of the disclosed embodiment and by reference to the appended drawings and claims.

BRIEF DESCRIPTION OF THE DRAWINGS

FIG. 1 is a cross-sectional view of a linear fluid actuator employing the differential transformer position sensor of the disclosed embodiment.

FIG. 2 is a diagram which illustrates the output of the differential transformer and the linearized output of the position sensor employed in the disclosed embodiment.

FIG. 3 is a schematic fluid and electrical diagram of the preferred embodiment of the linear servomechanism apparatus of the present invention.

FIGS. 4 and 5 graphically illustrate the relationship between the linear actuator position error, the air flow of a pneumatic cylinder linear actuator, the position of a valve controlling the air flow, and the valve actuation voltage provided by the disclosed embodiment of FIG. 3.

FIG. 7 is a flow chart diagram of the microcomputer subroutine for decelerating the movement of the actuator of FIG. 1.

DETAILED DESCRIPTION OF THE PREFERRED EMBODIMENT

Figure 6:
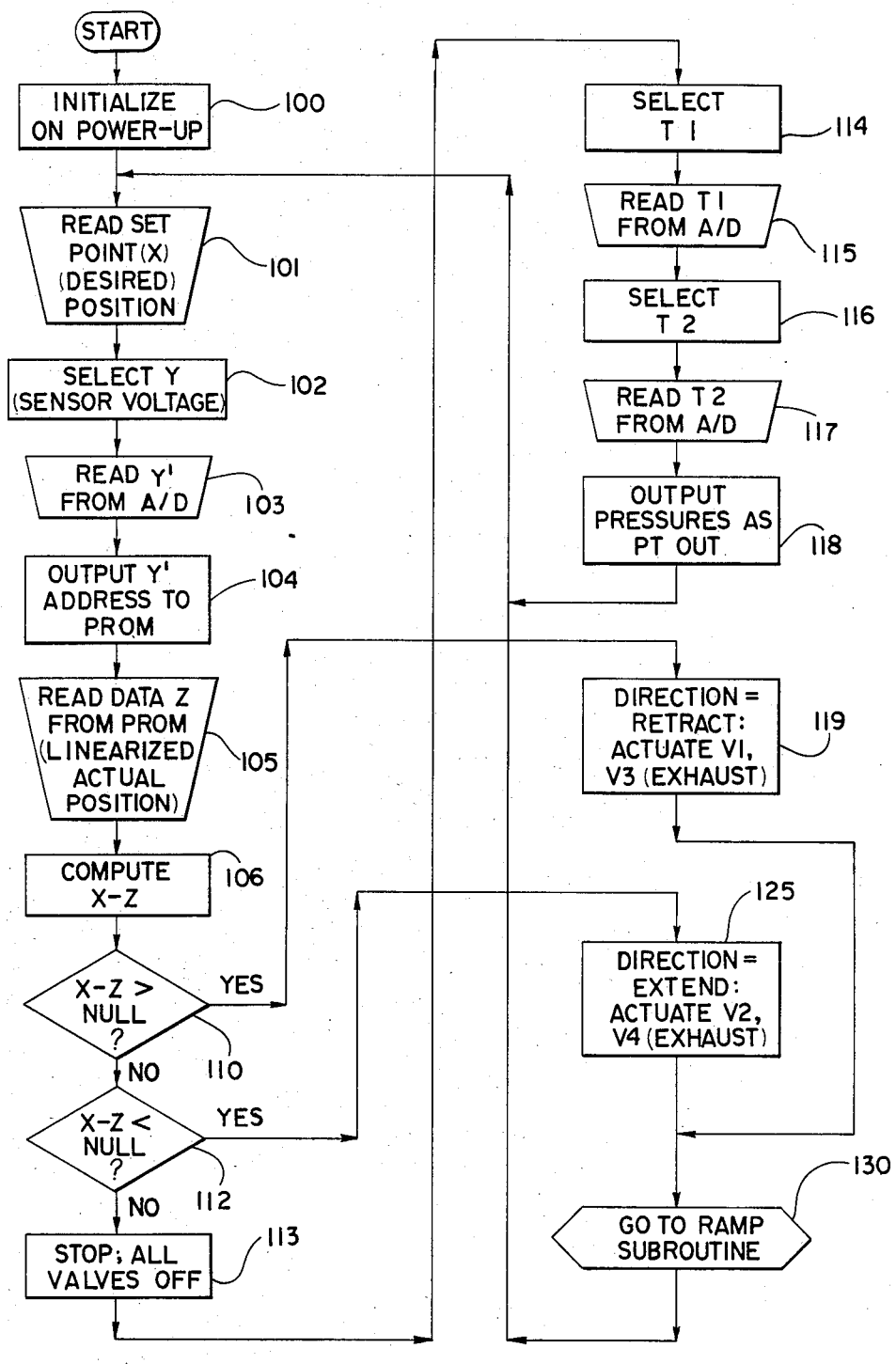
FIG. 6 is a flow chart diagram of the program of the microcomputer employed in the preferred embodiment.

The following detailed description is directed to linear servomechanism apparatus which incorporates an improved split-secondary differential transformer linear position sensor integrated with a pneumatic cylinder linear actuator, which is driven by solenoid valve that are pulse-width modulated to decelerate the piston of the actuator as the piston approaches a commanded position. However, it should be understood that the improved differential transformer linear position sensor may be successfully employed for use in connection with other types of linear and rotary actuators, in particular fluid actuators such as hydraulic actuators, as well as electrical linear actuators. It should also be understood that the modulation system for driving the fluid actuator may be successfully employed for use in connection with other types of position sensors in a servomechanism, for example, rotary or linear position encoders, potentiometers, or other types of position sensors. Accordingly, it will be understood that the description which follows merely sets forth a preferred embodiment and is not intended to be limited or restricted in scope in any way except as by reference to the appended claims.

Referring now to the drawings, in which like numerals illustrate like elements throughout the several views, there may be seen in FIG. 1 a linear fluid actuator 10 which incorporates an integrated split secondary differential transformer linear position sensor 11. The fluid actuator 10 of FIG. 1 comprises a pneumatic cylinder PN preferably constructed from non-ferrous stainless steel. The pneumatic cylinder PN includes an actuator rod or shaft 12 which is movable axially in the direction of arrow 13, and includes a modified piston 14 and ring 15. For rotary actuators, of course, rod or shaft 12 will be rotatably or angularly positionable. While the ring 15 may be of conventional construction, a portion 15 of the piston 14 should be constructed from a magnetically permeable material. The axial length of the magnetically permeable portion 16 of the piston should be sufficient to couple an electromagnetic field created by the primary coil of the differential transformer into one or the other or both of the secondary coils of the transformer.

In the preferred embodiment, the actuator rod 12 is also non-ferrous stainless steel. However, it should be understood that the actuator rod may also be constructed from magnetically permeable material. In such a construction, of course, the electromagnetic properties of the system will be different.

The linear position sensor comprises a variable differential transformer 11 fitted about the pneumatic cylinder PN. The differential transformer comprises a primary coil winding C1 and two secondary coil windings C2, C3 which are symmetrically spaced and wound about the outer circumference of the cylinder. The primary coil C1 is positioned in the mid-section of the cylinder between the spaced apart secondary coils. The magnetically permeable portion 16 of the piston 14 provides a path for the magnetic flux that links the windings. It should be understood that a plurality of primary and secondary coils may be placed in a series along the path of the movable member to extend the stroke which may be sensed.

The primary coil winding C1 is energized by an AC source, inducing voltages in the secondary windings. As will be more fully described in connection with FIG. 3, the secondary coils are connected series opposing so that the voltages induced in the secondary coils are of opposite phase.

Because the voltage output of the secondary coils are linearized by the circuitry in FIG. 3, the windings of the secondary coils C2, C3 can be low precision without compromising the accuracy of the position sensor. Therefore, it is considered a particular advantage of the present invention that the coils comprising the differential transformer may be non-precision wound, in contrast to linearly variable differential transformers, which consist of precision wound secondary coils to ensure a linear output.

The cylinder PN in FIG. 1 further includes fluid inlets 17, 18 for introducing pressurized fluid into the cylinder for extending and retracting the actuator rod 12. These fluid inlets 17, 18 are connected to a retract valve V1 and an extend valve V2, which are described in greater detail in connection with FIG. 3.

Additionally, the coils C1, C2, C3 of the differential transformer fitted about the cylinder PN are surrounded by an electromagnetic shield 19 to block out external magnetic influences from the coils.

FIG. 2 illustrates the differential transformer output Y as a function of the position X of the fluid actuator piston. As described above, the series opposing connection of the secondary coils of the transformer is a differential voltage which is zero when the electromagnetic field coupled from the primary coil into each of the seconday coils is equal. The waveform $Y_1$ reprsents the differential output voltage expected for the actuator shown in FIG. 1, which has the magnetically permeable material limited to the piston.

On the other hand, if a magnetically permeable actuator rod is also employed, it is believed that output $Y_2$ will be produced, having a slightly greater overall voltage swing and a voltage offset at the midpoint position. Because of the nonsymmetrical relationship of the magnetically permeable rod 12 and piston 14 with respect to the coils of the transformer, even when the piston is mid-stroke the transformer output voltage Y will not be zero. The zero voltage occurs when the piston is in the position approximately that shown in FIG. 1, where the flux coupled into the secondary coil C3 is the same as the flux coupled into the secondary coil C2. At this position, the flux coupled into coil C3 results principally from the magnetically permeable material in the piston 14, and the flux coupled into the coil C2 results principally from the magnetically permeable material in the actuator rod 12. Accordingly, it will be appreciated that the differential transformer output voltage $Y_2$ is grossly nonlinear, yet varies as a function of the position of the actuator rod and piston.

The differential transformer output voltage Y, which may be referred to as a "coil" signal, is converted into a signal which corresponds to and represents the actual position of the piston and actuator rod. The transformer output Y is linearized by digitizing the transformer output Y and using the digitized transformer output as an address for a lookup table in a programmable read only memory (PROM) (FIG. 3). Each memory location in the PROM contains digitized transformer output data which corresponds to specific known actuator positions. The position sensor is calibrated by generating a list of digitized transformer output voltages for specific known actuator displacement positions. During operation of the servomechanism, the calibrated information stored in the PROM is accessed by a control microcomputer and is used to transform or convert the differential transformer output voltage Y into an actual position signal or data, shown as Z in FIG. 2. Advantageously, the output of the split secondary differential transformer is thereby accurately linearized and allows use of low precision coils for the transformer windings.

Referring now to FIG. 3, there will now be described the schematic diagram illustrating the preferred embodiment of the servomechanism system of the present invention. The primary coil C1 is excited by an oscillator 20 and driver amplifier 21 to produce a time-varying electromagnetic field. The frequency of excitation is not believed to be critical, but should be chosen by applying the Nyquist criterion to the rate of sampling of the position. For example, for extremely slow actuators it is believed that an excitation frequency of about 60 Hz may be satisfactory. It will thus be appreciated that for such applications the primary coil can be connected directly to 110 volt AC conventional power source, and therefore allows use of low cost components since a separate oscillator is not necessary.

For most applications, however, a higher frequency of excitation is preferable. It is believed that for most types of fluid actuators, the frequency should be within a range of 60 Hz to 20 kHz, with a choice in the range of 400 Hz—1 kHz being most probable.

The secondary coils C2, C3 are connected series opposing so the induced voltages are of opposite phase. Accordingly, the non-dotted or unmarked-polarity terminals of the coils C2, C3 are connected to each other, while the dotted or polarity-marked terminals are each connected to the inputs of a conventional LVDT demodulator circuit 22. The outputs of demodulator 22, a variable DC voltage, are connected to the inputs of an operational amplifier 23. In the preferred embodiment, amplifier 23 is a conventional operational amplifier such as a type LM318 manufactured by National Semiconductor Corporation, Santa Clara, Calif. The output of amplifier 23 is the amplified differential transformer output voltage or coil signal Y.

In the preferred embodiment, the voltage Y is provided by jumpers J1–J3 to one input S1 of an analog multiplexer circuit 25. The other inputs S2, S3 of multiplexer 25 are connected to the outputs of pressure transducers 26, 27, which will be described in greater detail below.

In the preferred embodiment, the analog multiplexer 25 is a type AD7502 dual four channel monolithic CMOS analog multiplexer manufactured by Analog Devices, Inc., of Norwood, Mass. As known to those skilled in the art, the analog multiplexer 25 switches one of up to four analog inputs received on the input terminals S1–S3 to an output OUT on line 30, depending on the digital selection signals provided to the selection inputs A0, A1 on lines 28.

The output of the analog multiplexer 25 is provided on line 30 and through jumpers J4–J2 to the input of an analog-to-digital (A/D) converter circuit 31. The A/D converter used in the preferred embodiment is a type AD570 eight-bit converter also manufactured by Analog Devices. The eight-bits of output from the A/D converter are provided to the inputs of a three-state bus driver circuit 33, in the preferred embodiment a type 74LS244 eight-bit noninverting three-state driver manufactured by Texas Instruments, Inc., of Dallas, Tex. The outputs of the three-state driver then provided to an eight-bit data bus 35.

It should now be appreciated that there has been described circuitry for providing a signal from the secondary coils of a differential transformer configured as a linear position sensor, which signal varies as a function of the position of the magnetically permeable portion of the actuator rod, and circuitry for converting this signal into a digital signal. It will also be understood that the digital signal provided by the bus driver circuit 33 comprises a digital signal which varies as a function of the position of the actuator, except that the digital signal will vary nonlinearly. After digitizing, the transformer output or coil signal Y may be referred to as a digitized transformer output or coil signal Y'.

The preferred embodiment includes a programmable microcomputer 40 for transforming the digitized differential transformer output Y' into a digital actual position signal which represents the actual position of the actuator in linear terms, for comparing this actual position to a commanded or desired position, and for controlling the provision of pressurized fluid to drive the actuator to the commanded or desired position. In the preferred embodiment, microcomputer 40 is a type 8048 or 8748 eight-bit microcomputer manufactured by Intel Corporation of Santa Clara, Calif. It will be appreciated by those skilled in the art that other types of microcomputer circuits can be substituted for the microcomputer used in the disclosed embodiment with equally satisfactory results. The types 8048 and 8748 are particularly suitable for use in the present invention because they include on-board read-only memory for program storage, a 128×8 data memory, and an on-board timer/counter. Microcomputer 40 also includes a pair of output ports, PORT 1 and PORT 2, which are eight-bit quasi-bidirectional data ports, as well as a data bus DB0–DB7.

The eight-bits of PORT 2, comprising pins P20–P27, are connected to the outputs of driver circuit 33 on the bus 35. This bus is also connected via wire-OR connections to the outputs of a second three-state driver circuit 41, and to an output 42 designated PT OUT. The output 42 provides eight-bits or digital information which in the preferred embodiment represents the digitized sensed pressure from pressure transducers 26, 27.

The driver circuit 41 receives on its inputs eight bits comprising a commanded or desired position or other control parameter for the actuator, designated as SET POINT (X). This eight-bit word in the preferred embodiment represents the commanded position for the actuator, provided from an external source such as a host controller, a robot arm controller, thumb wheel switches, or other source. Other control parameters, such as deceleration distance, pressure set-point, velocity set-point, temperature, etc., may also be provided.

Selection for bus 35 between the digitized signal SET POINT and the digitized A/D converter output is made by line P10 of PORT 1. This signal is connected on line 43 to the enable (ENB) input of driver 33, and through an inverter 44 to the enable (ENB) input of driver 41. The microcomputer can read in on PORT 2 either the commanded position SET POINT (X) or the A/D converter output, depending upon whether P10 is made high or low.

When the digitized differential transformer voltage Y' is selected to appear on the bus 35, the microcomputer 40 reads in the digitized values on PORT 2, and transfers this digital signal to the microcomputer data bus 45, consisting of lines DB0–DB7. The data bus 45 is connected to the inputs of a latch circuit 46, and is also wire-ORed to the outputs of a programmable read only memory (PROM) 50. In the preferred embodiment, the latch circuit 46 is a type 74LS373 eight-bit D-type latch circuit manufactured by Texas Instruments. The clock (CK) input of the latch 46 is connected to the address latch enable (ALE) output of microcomputer 40, and allows the microcomputer to load the latch with data on the data bus 45 under program control.

The outputs of the latch 46 are connected to the address inputs (ADDR) of a PROM 50. Consequently, it will be appreciated that the digitized differential transformer voltage Y' received on PORT 2 in the preferred embodiment is passed directly by the microcomputer to the data bus 45 for use as an address for the PROM. The preferred PROM is a 256×8 PROM having three-state outputs such as a type 28L22 fuse-link PROM manufactured by Texas Instruments. The read (RD) signal from the microcomputer is connected on line 51 to the enable (ENB) of the PROM, so as to cause the PROM output Z to appear on the data bus 45 for reading by the microcomputer at the read time of the microcomputer clock cycle.

It should also be understood that an electrically alterable programmable read only memory can also be employed for purposes of self-calibration. For example, the microcomputer 40 can be placed into a self-calibration mode wherein an external calibration manipulator places the actuator in a known position, and provides the known position as the SET POINT signal to the microcomputer, which then stores in the electrically alterable PROM the known actuator position at the address being provided by the differential transformer output.

It should also be appreciated that greater resolution and accuracy may be obtained by usage of A/D converters having more bits of resolution, and by time-multiplexing the SET POINT signal to provide, say, sixteen bits of command position information.

Accordingly, it will now be appreciated that the PROM comprises means for storing digital signals corresponding to the actual position of the actuator at addressable locations corresponding to the digital position signal or differential transformer output.

The position of the actuator rod 12 of the pneumatic cylinder PN is controlled by solenoid valves which allow the introduction of pressurized fluid to extend or retract the piston. It should be understood however that other fluid control means such as piezoelectric valves or pumps could also be employed. The solenoid valves are controlled by the microcomputer 40 by signals emanating from PORT 1, on pins P11, P12, P13, and P14. The signals on these pins are connected to the inputs of solenoid drivers 53. In the preferred embodiment, solenoid drivers 53 comprise type 75475 dual peripheral drivers with output clamp diodes. Those skilled in the art will appreciate that the outputs of solenoid drivers 53, provided on lines 54, can be used to directly drive the coils of solenoid pneumatic valves used to drive the actuator.

The preferred valves employed in the disclosed embodiment are type EV-2-12 two-way and Ev-12-3 three way 12-volt solenoid poppet valves which have an open or close response time of about five milliseconds, manufactured by Clippard Instruments Laboratory, Inc., of Cincinnati, Ohio. Valve V1 for retracting the actuator and valve V3 for extending the actuator are three-way poppet valves. Valves V3, V4 are connected to the exhaust ports of the three-way valves V1, V2, and are used to close the exhaust port for directional control. A source of pressurized fluid from a reservoir 60 is connected on line 61 to the normally-closed ports of the three-way valves V1, V2. The normally-open ports of the valves V1, V2 are connected to the inlet ports of the two-way exhaust valves V4, V3 respectively. The common port of valve V1 is connected on line 63 to the retract inlet of the pneumatic cylinder, while the common port of the valve V2 is connected on line 64 to the extend inlet of the pneumatic cylinder. It will be appreciated that to retract the actuator, the valve V1 is actuated, allowing pressurized fluid to enter on line 63, while the exhaust valve V3 is simultaneously actuated, allowing the escape of fluid from the cylinder through line 64. Conversely, to extend the actuator, valves V2 and V4 are actuated.

In order to provide pressure sensing, for example for sensing the amount of force exerted by the actuator against a workpiece, pressure transducers 26, 27 are provided. Pressure transducer 26 is connected to line 63 for sensing the pressure in the retraction chamber of the cylinder, while transducer 27 is connected to line 64 to sense the pressure in the extension chamber of the cylinder.

In the preferred embodiment, transducers 26, 27 are type Series EPIS-080-100-G 15-volt excitation, 100 PSI, gauge-type pressure transducers manufactured by Entran Devices, Inc. of Fairfield, N.J. Transducer 26 provides a transducer output voltage T1 to the S2 input of analog multiplexer 25, while transducer 27 provides a transducer output voltage T2 to the S3 input of the multiplexer. These transducer outputs may be selected for provision to the A/D converter 31, and thence may be provided as the signal PT OUT on line 42.

In systems not employing pressure transducers, analog multiplexer 25 may optionally be omitted to save cost, and the differential transformer output voltage Y may be connected directly to the A/D converter by connecting jumper J1 to J2 and disconnecting jumpers J1-J3 and J2-J4.

In order to provide for smooth control of the movement of the actuator, the disclosed embodiment of the servomechanism is operable in two modes: a slew mode of accelerating and moving the actuator as rapidly as possible, and a modulated or ramp mode for decelerating the actuator as the commanded or desired position as approached. FIGS. 4 and 5 illustrate two different modulation schemes, although other schemes may occur to those skilled in the art after the discussion which follows.

Referring now to the diagrams of FIG. 4, the top graph illustrates the actuator position error $X-Z$ as computed by the microcomputer. X represents the magnitude of the SET POINT signal, which corresponds to the desired or command position for the actuator, while Z represents the magnitude of the linearized actual position data read from the PROM. Notice that the actuator position error, which is the difference between the command position and the actual position, decreases over time as the actuator approaches the command position, until a "null" or offset error is achieved.

The bottom graph illustrates the actuation voltage for the solenoid valve. In order to slew the actuator, the microcomputer actuates selected valves and returns to sense the position of the actuator. The flow charts of FIGS. 6 and 7 described this in more detail. The valve actuation voltage comprises an on-portion at the voltage level of $+V$ required to actuate the solenoid valve, and an off-portion of zero volts, when the valves are not actuated. As shown in the graph representing the air flow, the air flow is maintained at maximum during the slew portion.

When the actuator reaches a predetermined distance from the command position, represented by a predetermined actuator position error which may be designated as a "ramp point", the deceleration of the actuator begins. In order to effectuate deceleration, the actuation voltage or signal for the valves is pulse-width modulated so as to cause the valves to progressively decrease the air flow to the actuator. In the disclosed embodiment, the duty cycle of the valve actuation voltage is a function of the actuator position error $X-Z$. As shown in the valve position graph, the valve is maintained in the open position for progressively decreasing amounts of time as the actuator position error decreases, until the actuator position error reaches the null valve. Although the preferred three-way valves have an extremely rapid response time, the valves may not always completely close prior to being re-actuated by the microcomputer.

FIG. 5 illustrates an alternative frequency modulation (FM) ramp scheme. In the FM ramping, the valve actuation pulses have a constant duty cycle (50% in FIG. 5), but the valve actuation voltage (and thus pulse width) is made progressively shorter in duration, thereby progressively decreasing the air flow. The FM scheme illustrated may be desirable for use in applications requiring a more rapid deceleration and smoother motion toward the end point or null position. The 50% duty cycle may provide time for completely closing the valves early in the deceleration, as contrasted with FIG. 4, where the valves do not completely close until later in the deceleration. It should be understood that FM is a species of "pulse width" modulation as the term is used herein, since the pulses provided are of progressively shorter durations or widths. Moreover, it should be understood that PWM and FM may be combined in the present invention by providing a progressively decreasing duty cycle over a progressively decreasing actuation voltage cycle duration.

The modulation technique may also be employed for speed control. It has been found that at 50 pulses per second, at a near 100 percent duty cycle and 100 PSI air pressure, the velocity, of a typical half-inch diameter pneumatic cylinder can exceed 30 inches per second. By use of restrictive orifices on the exhaust valve, the speed of the actuator may be reduced. Additionally, reducing the duty cycle of the valve actuation pulses reduces speed by "blipping" or pulsing the valves. For example, at a two percent duty cycle for the valve actuation voltage, the speed of the actuator can be made as small as 0.05 inches per second.

Use of the modulation technique also provides accurate and repeatable positioning. Tests have demonstrated accuracies of 0.030 inches over eight inches of actuator stroke. For shorter stroke actuators such as three inches, accuracies of 0.010 inches have been obtained, with a repeatability of about 0.005 inches.

Additionally, still greater control may also be obtained by modulation of the actuation of the exhaust valves simultaneously with modulation of the inlet valves.

The modulation technique is also useful for controlling the actuator based on an input control parameter other than position. For example, the system can be used to control actuator movement based on a provided control parameter without regard to what the provided control parameter represents.

OPERATION

Turning now to FIGS. 6 and 7, the general operation of the preferred embodiment of the servomechanism apparatus illustrated in FIG. 3 will now be described. FIG. 6 is a flow chart diagram which demonstrates a sequence of steps which may be embodied as a program for microcomputer 40. Those skilled in the art will understand and appreciate that a servomechanism apparatus as described herein may be constructed by circuits comprising digital and analog hardware, or by preferred embodiment, as disclosed herein, using a programmed microcomputer together with the described peripheral digital and analog circuitry. It will be understood that the embodiment disclosed herein is merely illustrative and that the functional equivalents of microcomputer 40 may include other devices including digital hardware, firmware, or software, which are capable of performing the described functions and sequences in the servomechanism. It will be further appreciated that the microcomputer 40 may be programmed to perform the steps outlined in FIG. 6.

Starting at 100, when power is provided to the microcomputer 40, program operation automatically begins. An initializing routine is first executed, which among other things resets or clears internal registers in preparation for use.

At 101, the digital signal SET POINT (X) is read by enabling the driver 41, to input the command or desired position X from the host controller or other external source.

At 102, the microcomputer selects the differential transformer (position sensor) voltage Y to be provided to the A/D converter 31 by appropriate signals on select lines 28.

At 103, the digitized differential transformer voltage Y' is selected by enabling the driver 33, and the digitized coil signal is read. It will be recalled that this digitized coil signal varies as a function of the position of the actuator rod.

The digitized differential transformer output voltage Y' is then provided by the microcomputer to the data bus 45, and clocked into the latch 46 to be used as an address for PROM 50. This step is shown at 104. At 105, the digital actual position Z, which represents the linearized actual position of the actuator, is then placed on the data bus 45 when the microcomputer 40 reads in the data.

Then, at 106, the microcomputer computes the difference $X-Z$, which represents the actuator position error.

At 115, the position error $X-Z$ is compared to a predetermined null or offset value, which those skilled in the art will understand is necessary to prevent oscillation. If the actuator position error exceeds the null, the program branches to block 119, described below. If the actuator position error does not exceed the null, the inquiry is made at 112 whether the position error is less than the null value, which includes negative values. If so, the program branches to block 125, described below, and if not, to block 113.

If 113 is reached, the actuator position error is within the null range and all valves are closed, stopping the actuator.

At blocks 114–117, if the pressure transducers 26, 27 are present, the transducer outputs T1 and T2 are selected at the multiplexer 25, digitized by the A/D converter, and provided at 118 as the pressure transducer output signal PT OUT on line 42.

It should be understood that pressure sensing as just described occurs when movement of the actuator has ceased. However, it should also be understood that pressure sensing can also occur at other times during the program sequence. For example, the system may be programmed to drive the actuator to reach a pressure SET POINT as well as a position SET POINT, so that a combination of position and pressure can be employed to provide the servomechanism with tactile sensitivity. This feature is especially desirable when the servomechanism is employed to control the gripper of a robot manipulator arm.

If at 110 the actuator position error has been found to be greater than the null, the actuator should be retracted. At 119, retraction is effectuated by actuating exhaust valve V3, and actuating valve V1 to allow pressurized fluid into the pneumatic cylinder. From 119, the program enters a modulation or ramp subroutine 130, which is described in detail in FIG. 7. Upon exiting the ramp rubroutine 130, the program returns to 101.

Similarly, if the actuator position error is less than the null at 112, the actuator is to be extended. At 125, the exhaust valve V4 is actuated and the valve V2 is actuated, allowing pressurized fluid to extend the actuator rod. Again, the program then enters the ramp subroutine 130 and returns to 101.

In FIG. 7, the ramp subroutine determines whether the actuator is placed in the slew mode or in the modulation or ramp mode for deceleration. Entering this subroutine at 131, the microcomputer computes the absolute value of the actuator position error X−Z. This absolute value is compared to a predetermined ramp point value, which represents a predetermined distance from the command or desired position for the actuator. If the actuator has not yet reached the ramp point, the slew mode is indicated, and the program branches to 133.

At 133, the selected valves for extending or retracting are maintained in the on-position in the slew mode. It will thus be appreciated that the air flow provided to move the cylinder is at maximum, as illustrated in FIG. 4.

If the position of the actuator has been detected to be beyond the ramp point, that is, the actuator has approached to within a predetermined distance from the desired position, from 132 the program branches to 135, and the ramp or modulation mode is selected. In this mode, the selected valves are pulse width modulated so as to provide a variably decreasing valve actuation signal as a function of the actuator position error. As shown in FIG. 7, the selected valves are maintained in the on position for a fractional portion of 16 milliseconds, which is a fixed cycle time. The fractional portion is the actuator position error divided by the magnitude of the predetermined ramp distance. After maintaining the selected valves on for the computed fractional portion of 16 milliseconds, the valve is maintained in the off position for the remainder of the 16 millisecond period, prior to exiting the subroutine. Accordingly, it will be appreciated that the effect of block 135 is to provide a pulse width modulation for the signal actuating the selected valves, with a progressively decreasing duty cycle.

For pure FM modulation, those skilled in the art will understand that microcomputer 40 is programmed to actuate the selected valves for a similarly computed fractional portion of an initially selected cycle time, say 16 milliseconds, and then turned off for an equal amount of time, prior to exiting the subroutine. For a combination scheme with FM and a decreasing duty cycle, an initial cycle time and duty cycle are selected and then simultaneously decreased over time.

It will also be appreciated that microcomputer 40, when programmed according to block 135, provides a means for providing a modulated actuator driving signal which varies as a function of the magnitude of the error signal. It will be further appreciated that there has been described means for providing a driving signal for the actuator which is a function of the difference between the desired or command position and the actual position of the actuator, and means for moving the actuator in response to the driving signal to drive the actuator to the command position. It will thus be appreciated that the described apparatus comprises a closed-loop servomechanism.

The foregoing has been a description of the structure and operation of the preferred embodiment of the present invention of a linear servoactuator with an integrated transformer position sensor. It will be appreciated that other alternative functions and sequences of operation of the apparatus may be performed by the structure described herein while still remaining within the scope of the present invention. It will be appreciated by those skilled in the art that the apparatus disclosed herein may be arranged so that the functional operation of the system can be readily modified by simply changing a few circuit connections or by changing the program sequence of operation of the microcomputer. Thus, it will be appreciated that the foregoing description has been merely illustrative and that the present invention is limited solely by the appended claims.

I claim:

1. An integrated servomechanism and position sensor apparatus, comprising:
   an actuator including a variably positionable magnetically permeable portion confined to move only within a predetermined space;
   a split secondary transformer having a primary coil and a pair of spaced-apart secondary coils;
   means for exciting said primary coil to produce a time-varying electromagnetic field within said predetermined space,
   movement of said magnetically permeable portion within said predetermined space coupling said electromagnetic field into said secondary coils;
   circuit means connected to said secondary coils for providing a coil signal which varies as a function of the position of said magnetically permeable portion of said actuator;
   means responsive to said coil signal for transforming said coil signal into an actual position signal which varies as function of the position of said actuator;
   command position signal means for providing a desired position signal corresponding to a desired position for said actuator;
   means for providing a driving signal as a function of the difference between said desired position signal and said actual position signal; and
   actuator moving means responsive to said driving signal for generating an actuator driving force within said predetermined space for causing said actuator to move toward said desired position.

2. The apparatus of claim 1, wherein said actuator comprises a linear fluid-driven cylinder having a movable piston.

3. The apparatus of claim 2, wherein said actuator moving means comprises a source of pressurized fluid and selectively actuatable valve means for allowing pressurized fluid into said cylinder to move said piston.

4. The apparatus for claim 3, further comprising pressure sensing means operatively coupled to said cylinder for providing a pressure signal related to the pressure within said cylinder, whereby the force exerted by said actuator against a workpiece is sensed.

5. The apparatus of claim 3, wherein said valve means is actuated by a modulated signal having a duration related to the difference between said desired position signal and said actual position signal.

6. The apparatus of claim 5, wherein said modulated signal has a progressively decreasing duty cycle.

7. The apparatus of claim 5, wherein said modulated signal has a progressively decreasing cycle time.

8. The apparatus of claim 3, wherein said comparing means is responsive to provide said driving signal as a pulse width modulated signal for actuating said valve means, said pulse width modulated signal having an on-portion for actuating said valve means to allow pressurized fluid into said cylinder to move said piston and an off-portion for blocking off pressurized fluid from said cylinder.

9. The apparatus of claim 8, wherein said pulse width modulated signal has a duration related to a difference between said desired position signal and said actual position signal.

10. The apparatus of claim 2, wherein said piston comprises said magnetically permeable portion of said actuator.

11. The apparatus of claim 1, wherein said actual position signal is a digital actual position signal and said desired position signal is a digital desired position signal; and wherein said transforming means, said position signal means, and said driving signal means comprises:
conversion means for converting said coil signal into a digital position signal, and
a programmed microcomputer operative for transforming said digital position signal to said digital actual position signal and for providing said driving signal as a function of the difference between said digital desired position signal and said digital actual position signal.

12. The apparatus of claim 11, further comprising preprogrammed memory means for storing digital signals corresponding to said digital actual position signal at addressable locations corresponding to said digital position signal.

13. A position sensor apparatus, comprising:
a magnetically permeable member which is variably positionable within a predetermined space;
a split secondary transformer having a primary coil positioned between a pair of spaced-apart secondary coils;
means for exciting said primary coil to produce a time-varying electromagnetic field,
said magnetically permeable member being operative to couple said electromagnetic field into one of said secondary coils at all positions within said predetermined space;
circuit means connected to said secondary coils for providing a coil signal which varies in a nonlinear manner corresponding to the spatial position of said magnetically permeable member in said predetermined space;
conversion means for converting said coil signal into digital address signals;
programmed memory means for storing digital actual position signals corresponding to a linearized actual position of said magnetically permeable member in said predetermined space at addressable locations corresponding to said digital address signals; and
means responsive to said digital address signals for reading said digital actual position signals from said memory means and for providing said digital actual position signals as an output signal incicative of the actual position of said magnetically permeable member within said predetermined space.

14. The apparatus of claim 13, wherein said position of said magnetically permeable member is an axial position.

15. A linear servomechanism apparatus, comprising:
a fluid driven linear actuator including an axially variably positionable actuator rod having a magnetically permeable portion confined to move only within a predetermined space;
a split secondary transformer having a primary coil positioned between a pair of spaced apart secondary coils;
means for exciting said primary coil to produce a time-varying electromagnetic field within said predetermined space, movement of said magnetically permeable portion coupling said electromagnetic field into said secondary coils;
circuit means connected to said secondary coils for providing a coil signal which varies as a function of the position of said actuator rod;
means responsive to said coil signal for transforming said coil signal into an actual position signal which varies as a function of the axial position of said actuator;
command position signal means for providing a desired position signal corresponding to a desired axial position for said actuator rod;
error signal means for providing an error signal as a function of a difference between said desired position signal and said actual position signal;
modulation means for providing a modulated actuator driving signal which varies as a function of the magnitude of said error signal, said driving signal comprising an on-portion and an off-portion; and
valve means responsive to said driving signal for introducing pressurized fluid into said predetermined space to move said actuator rod during said on-portion of said driving signal and for blocking off said pressurized fluid from said predetermined space during said off-portion of said driving signal.

16. An integrated servomechanism and position sensor apparatus, comprising:
an actuator including a magnetically permeable portion which is variably positionable within a predetermined space;
a split secondary transformer having a primary coil positioned between a pair of spaced-apart secondary coils;
means for exciting said primary coil to produce a time-varying electromagnetic field,
said magnetically permeable portion being operative to couple said electromagnetic field into said secondary coils at positions within said predetermined space;
circuit means connected to said secondary coils for providing a coil signal which varies in a nonlinear manner corresponding to the spatial position of said magnetically permeable portion of said actuator;
means responsive to said coil signal for transforming said coil signal into a linearized actual position signal which varies linearly as a function of the position of said actuator within said predetermined space;
command position signal means for providing a desired position signal corresponding to a desired position for said actuator;
means for providing a driving signal as a function of the difference between said desired position signal and said actual position signal; and
actuator moving means responsive to said driving signal for causing said actuator to move toward said desired position.

17. An integrated servomechanism and position sensor apparatus, comprising:
an actuator including a variably positionable magnetically permeable portion confined to move only within a predetermined space;
means for generating an actuator driving force within said predetermined space for moving said actuator and said magnetically permeable portion; p1 electromagnetic coil means for sensing movement of said magnetically permeable portion within said predetermined space; and control means responsive to said electromagnetic coil means for deriving position information of said actuator from movement of said magnetically permeable portion and for causing said actuator driving force generating means to move said actuator and said magnetically permeable portion toward a desired position.

18. The apparatus of claim 17, wherein said actuator driving force is a fluid force.

19. The apparatus of claim 18, wherein said actuator comprises a linear fluid-driven cylinder having a movable piston.

20. The apparatus of claim 19, wherein said actuator driving force generating means comprises a source of pressurized fluid and selectively actuatable valve means for allowing pressurized fluid into said cylinder to move said piston.

21. The apparatus of claim 19, wherein said piston comprises said magnetically permeable portion of said piston.

22. The apparatus of claim 17, further comprising means for generating an electromagnetic field within said predetermined space, and wherein said electromagnetic coil means senses variations in said electromagnetic field produced by movement of said magnetically permeable portion within said predetermined space.

23. The apparatus of claim 22, wherein said electromagnetic field generating means and said electromagnetic coil means comprises a variable differential transformer.

24. The apparatus of claim 17, further comprising command position signal means for providing a desired position signal corresponding to said desired position for said actuator, wherein said control means derives an actual position signal which varies as a function of the position of said actuator, and wherein said control means causes said actuator driving force generating means to move said actuator as a function of the difference between said desired position signal and said actual position signal.

25. The apparatus of claim 24, wherein said control means comprises a programmed microcomputer operative for receiving said desired position signal, deriving said actual position signal as said position information from signals from said electromagnetic coil means, and providing a driving signal for causing said actuator driving force generating means to move said actuator and said magnetically permeable portion.

* * * * *